W. V. TURNER.
HIGH PRESSURE SERVICE BRAKE.
APPLICATION FILED MAY 6, 1907.
1,011,528.
Patented Dec. 12, 1911.
3 SHEETS—SHEET 2.
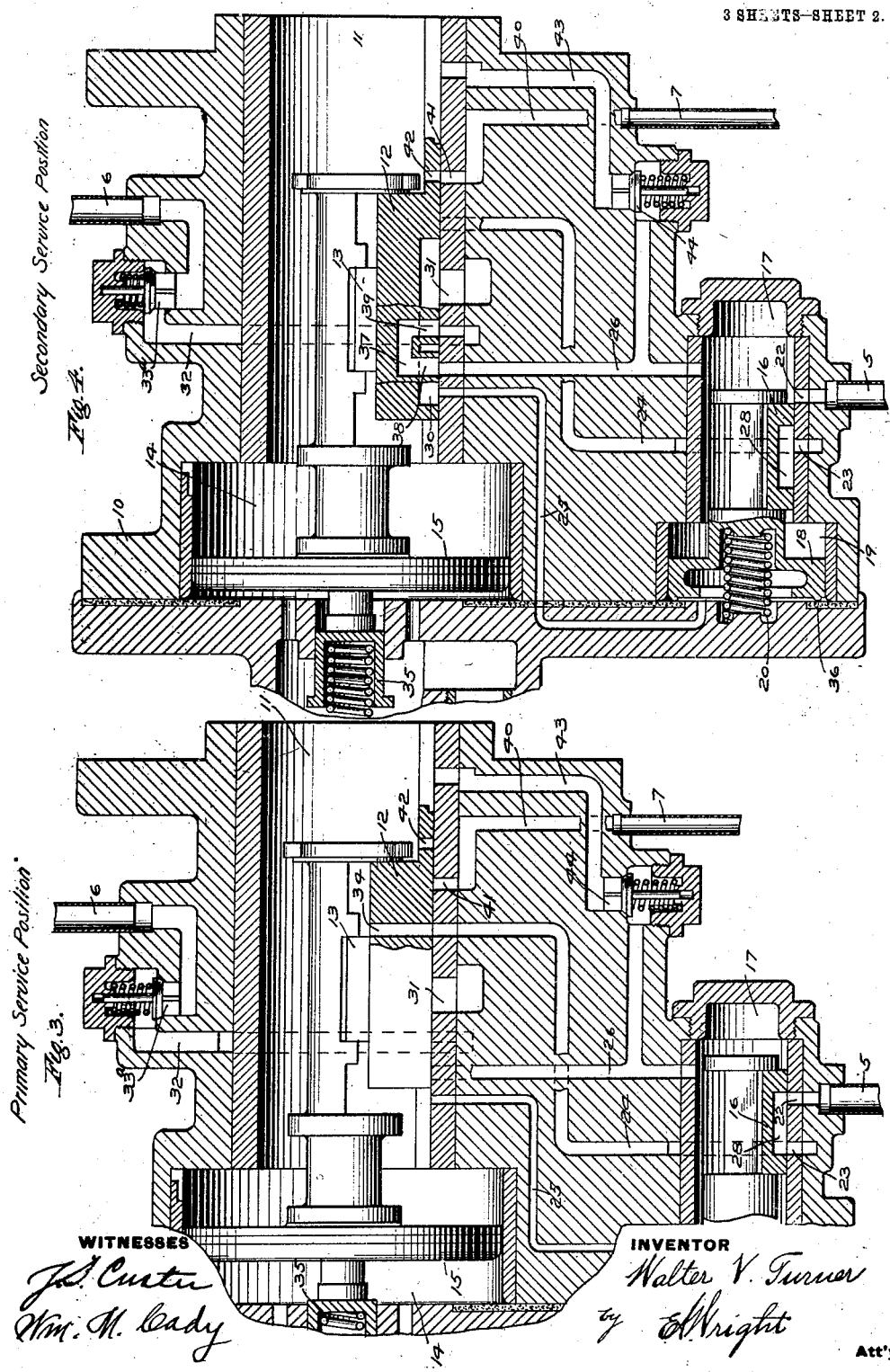

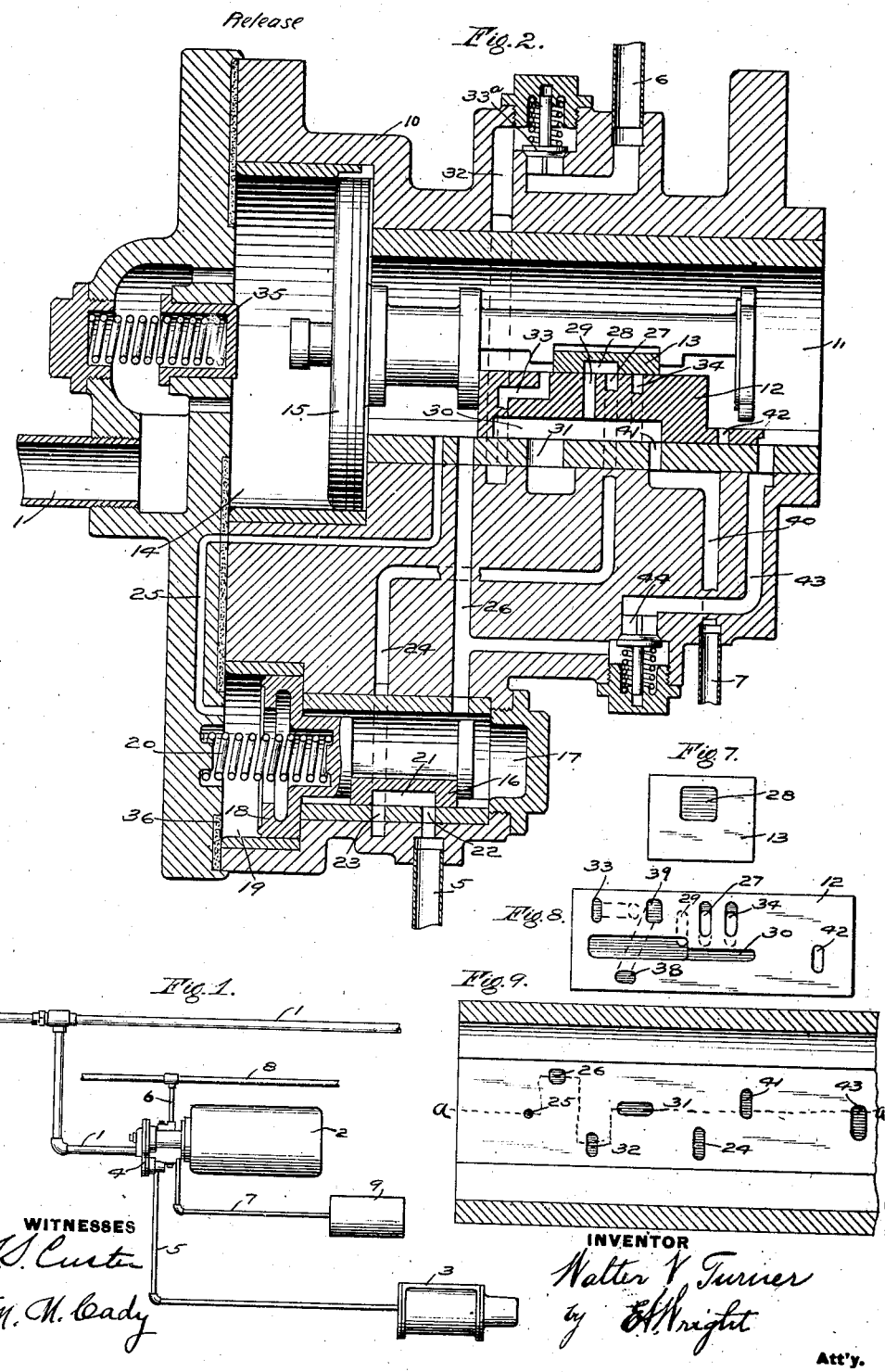

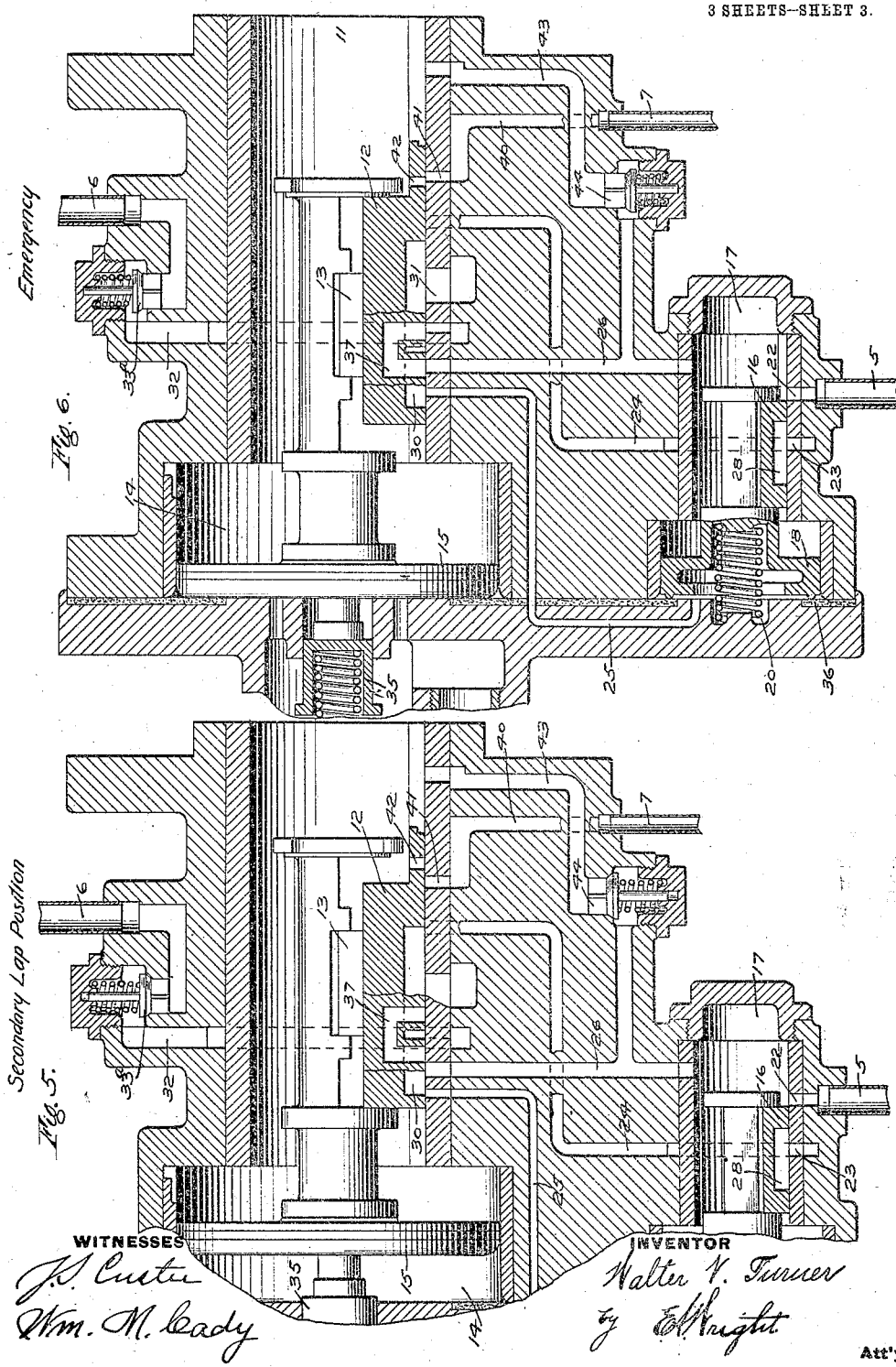

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

HIGH-PRESSURE-SERVICE BRAKE.

1,011,528.    Specification of Letters Patent.    Patented Dec. 12, 1911.

Application filed May 6, 1907. Serial No. 371,970.

*To all whom it may concern:*

Be it known that I, WALTER V. TURNER, a citizen of the United States, residing at Edgewood, in the county of Allegheny and State of Pennsylvania, have invented new and useful Improvements in High-Pressure-Service Brakes, of which the following is a specification.

My invention relates to fluid pressure brakes particularly designed for what is known as traction service, such as electric cars, though also adapted for general use.

In this class of service, it has been found desirable, to be able to obtain at times, in service applications of the brakes, a high degree of pressure in the brake cylinder. With the usual standard brake equipment as used in this service, the maximum pressure obtainable in service applications of the brakes, is limited to the degree at which the auxiliary reservoir and brake cylinder pressures equalize. A higher pressure may, of course, be obtained by increasing the relative volume of the auxiliary reservoir as compared with that of the brake cylinder, but the difficulty is then encountered, that for a given reduction in train pipe pressure a larger volume of air will flow into the brake cylinder from the auxiliary reservoir than in the case of the usual size of apparatus, from which it is evident that gradations in brake cylinder pressure, up or down, cannot be made as fine as desirable, consequently impairing the flexibility of the brake.

The principal object of my invention is, therefore, to obviate the above difficulty, and for this purpose it comprises a valve mechanism, operated by gradual reductions in train pipe pressure, for supplying air from the auxiliary reservoir to the brake cylinder until the auxiliary reservoir pressure substantially equalizes, and adapted on subsequent reductions in train pipe pressure to supply air from a supplemental reservoir, or other additional source of fluid pressure supply, to the brake cylinder.

Another feature comprises improved means for graduating the release of the brakes and for returning a portion of the air from the brake cylinder into the auxiliary reservoir during the release of brakes after the same have been applied with high pressure.

These and other features of my invention will be hereinafter more fully described and claimed.

In the accompanying drawings; Figure 1 is a diagrammatic view of a single car air brake equipment, with my invention applied; Fig. 2 a central sectional view of a triple valve device embodying a preferred form of my improvements, and showing the parts in full release position; Fig. 3 a similar view, showing the parts in the primary service application position, in which air is supplied to the brake cylinder from the auxiliary reservoir; Fig. 4 a similar view, but with the main slide valve and seat in broken section as indicated at *a—a* in Fig. 9, showing the parts in the secondary service application position, in which air is supplied to the brake cylinder from a supplemental source of fluid pressure supply; Fig. 5 a similar view, showing the parts in lap position, as assumed after a secondary service application; Fig. 6 a similar view, showing the parts in the emergency application position; Fig. 7 a face view of the auxiliary or graduating slide valve; Fig. 8 a similar view of the main slide valve, showing the position of the ports and cavities, and Fig. 9 a plan view of the main slide valve seat, showing the location of ports.

My invention is shown in Fig. 1 as applied to a car equipment comprising a train pipe 1, auxiliary reservoir 2, brake cylinder 3, connected by pipe 5 to triple valve device 4, which is also connected by pipes 6 and 7 to control pipe 8, or other source of fluid pressure supply, and vent chamber or reservoir 9, respectively.

Although my invention may be applied as a separate valve device, in the preferred construction, as shown in the drawings, the invention is embodied in a triple valve device and comprises a casing 10 having the usual main slide valve chamber 11, communicating with the auxiliary reservoir and containing the main slide valve 12 and graduating valve 13, and having piston chamber 14, containing the triple valve piston 15, and communicating with the train pipe 1.

Communication with the brake cylinder may be controlled by a supplemental slide valve 16, contained in a valve chamber 17 and adapted to be operated by a piston 18, contained in a piston chamber 19. A spring 20 tends to maintain said piston 18 in the extreme inner position, in which a cavity 21 in the supplemental slide valve 16 establishes communication between a port 22 leading to the brake cylinder pipe 5 and a port 23 of a passage 24 leading to the seat of the main slide valve 12.

Passages 25 and 26 open respectively to piston chamber 19 and supplemental valve chamber 17 on opposite sides of the piston 18, and lead to the main slide valve seat. In full release position of the main slide valve and piston, as shown in Fig. 2, both passages 25 and 26 are open to the valve chamber 11 and auxiliary reservoir, so that the fluid pressure on the piston 18 is balanced and the spring 20 maintains said piston at its inner position and the brake cylinder is open to the exhaust through pipe 5, port 22, cavity 21 in the supplemental valve 16, passage 24, through ports 27 and 29, which are connected by cavity 28 in the auxiliary valve 13, and cavity 30 in the main slide valve which is open to the exhaust port 31. The small reservoir or chamber 9 is also open to the atmosphere through pipe 7, passage 40, port 41, cavity 30 and exhaust port 31 in this position of the valve.

Air being supplied to the train pipe, flows into the main piston chamber 14 and through the usual feed groove around the triple piston 15 to valve chamber 11 and auxiliary reservoir, which are thus charged to the standard pressure. Air also flows through passages 25 and 26 to opposite sides of the supplemental piston 18, charging the piston chamber 19 and supplemental valve chamber 17.

The additional source of pressure or control pipe 8 communicates through pipe 6 and a passage 32, leading to the main slide valve seat, with a through port 33, in the main slide valve, which is open to the valve chamber 11 in release position. A check valve 33ª may be arranged in the passage 32, in order to prevent back flow in case the control pipe parts, as when the train breaks in two. A supplemental reservoir may be used in place of the control line, in which case the check valve 33ᴬ is omitted, so that said reservoir may be charged to the standard pressure from the train pipe through valve chamber 11, port 33 and passage 32, in release position.

A service application is made in the usual way, by reducing the train pipe pressure, in response to which, the main piston 15 assumes service position, as shown in Fig. 3, engaging the usual graduating spring stop 35, and shifting the main slide valve 12 and graduating valve 13, so that a service port 34 in said main valve registers with brake cylinder port 24, air then flows to the brake cylinder, until auxiliary reservoir pressure is reduced slightly below train pipe pressure, when the same returns the piston to lap position, moving the graduating valve 13 to close the service port 34. In service position the main slide valve covers the passage 26 while the passage 25 remains open, and no substantial change in pressure occurs on the supplemental piston 18, so that the supplemental valve remains in its inner position. In like manner, by making further reductions in the train pipe pressure, the brake cylinder pressure may be increased or graded up until the pressure in the auxiliary reservoir has substantially equalized into the brake cylinder; then, upon a further reduction in train pipe pressure, the main piston 15 is moved outwardly beyond the usual service position, by auxiliary reservoir pressure, which is no longer reduced by flow into the brake cylinder, to a point as shown in Fig. 4 at which passage 25, to the outer face of the supplemental piston 18, registers with exhaust port 30.

The supplemental piston chamber is thereby vented to the exhaust port 31, which is still open to the exhaust cavity 30. Fluid pressure on the inner face of the piston 18 thereupon moves the same to the extreme outer position, where it is seated on the gasket 36, and the supplemental valve is shifted, uncovering port 22 so that communication is established from the valve chamber 17 to the pipe 5 and the brake cylinder 3.

The main slide valve 12 is provided with a cross over port 37, having port openings 38 and 39 which register, in this position of the parts, with passages 26 and 32 respectively, so that communication is established from the supplemental reservoir or control pipe 8 through passage 32, cross over port 37, passage 26, supplemental valve chamber 17 to port 22 and brake cylinder pipe 5, and air from the control pipe flows to the brake cylinder. In this position, which may be termed the secondary service position, an additional port 42 in the main slide valve 12 registers with a port 41 communicating with a passage 40 and pipe 7 leading to a chamber 9. In full release position of the parts, said port 41 is open to the exhaust cavity 30 and exhaust post 31, so that the air in chamber 9 is normally at atmospheric pressure, and in the secondary service position, air at the higher pressure in the valve chamber 11 and auxiliary reservoir will be vented to said chamber 9, causing a sudden slight reduction of pressure in the auxiliary reservoir space, so that when the train pipe reduction ceases the train pipe pressure and the graduating spring move the main piston 15 inwardly to the limit of movement of the spring device 35. In this position, which may be termed secondary lap position, as shown in Fig. 5, passage 25 and the outer supplemental piston chamber are still open to the exhaust, so that the valve 16 retains its outer position, but the main slide valve 12 moves sufficiently to close communication between the control pipe and the brake cylinder, and also from the auxiliary reservoir to the vent chamber 9. If preferred the vent port 41 may communicate with the atmosphere. By thus making further successive reductions in train pipe pressure, the brake cylinder pressure may be graded up to any desired amount, the main piston 15 moving between the secondary lap position, shown in Fig. 5, and the secondary service position, shown in Fig. 4, until the auxiliary reservoir pressure has fully equalized into the chamber 9, the main piston 15 will then remain in the outer service position, with communication open between the brake cylinder and the control pipe, so that the brake cylinder pressure may be maintained at the control pipe pressure through the open communication.

The brakes may be released after a secondary application by increasing the train pipe pressure, which moves the main piston 15, and slide valves 12 and 13 to their extreme inner position, where ports 25 and 26 are open to the main slide valve chamber 11.

It will be noted that the auxiliary reservoir pressure after a secondary service application is considerably less than the pressure in the brake cylinder and supplemental valve chamber 17, by reason of the equalization into the brake cylinder and the expansion chamber 9, so that when the main piston returns to full release position, the outer face of the supplemental piston, which is now open to the valve chamber 11 and auxiliary reservoir, is at a lower pressure than that on the inner face of the piston so that said piston remains in its outer position, the passage 26 being open to the main slide valve chamber 11, air from the brake cylinder flows therethrough and raises the pressure in the auxiliary reservoir, and likewise on the outer face of the supplemental piston 18, until the opposing pressures becoming equalized, the spring 20 then moves the piston 18 to its inner position, in which cavity 28 of the supplemental valve 16 establishes communication between brake cylinder port 22 and port 23, so that the brake cylinder is now open to the exhaust, through passage 24, port 27, cavity 28, port 29 and exhaust cavity 30 to exhaust port 31. In this position, the vent chamber port 41 registers with exhaust cavity 30 so that the vent chamber 9 is exhausted to the atmosphere. It will thus be evident that part of the air in the brake cylinder is saved by venting into the auxiliary reservoir and that thereby the auxiliary reservoir is more quickly recharged.

In order to grade down the pressure in the brake cylinder after a primary service application, a gradual increase in train pipe pressure is made, which moves the main piston 15 and slide valves to release position, opening the brake cylinder exhaust. Port 33 also registers with passage 32, so that air from the supplemental source of fluid pressure is supplied to the valve chamber 11 and auxiliary reservoir, increasing the pressure therein sufficiently to move the main piston and graduating valve outwardly to close the exhaust port 27 and inlet port 33. Further reductions in brake cylinder pressure may be made as desired in the same manner. A gradual reduction in brake cylinder pressure may also be made after a secondary service application, by causing a wave of increased pressure to flow in the train pipe, whereby the main piston 15 and the main slide valve and auxiliary valve are moved to the full release position, and, as in the case of a full release as before described, the supplemental piston and valve remain in their outer position. Air then flows from the brake cylinder through passage 26 to the main slide valve chamber 11 and auxiliary reservoir, and also from the control pipe through passage 32 and port 33 to said valve chamber, thereby raising the pressure therein and on the piston 15 so that said piston is moved outwardly, and the auxiliary valve 13 closes port 33, as the piston continues its onward movement the main slide valve closes passage 32 and passage 26, cutting off the flow of air from the supplemental source of pressure and from the brake cylinder to the auxiliary reservoir. Further outward movement of the piston 15 is limited by the spring stop 35. By a further increase in train pipe pressure the above operation may be repeated, and the brake cylinder pressure again reduced. As in making a full release of the brakes, it will be noted that a portion of the brake cylinder air is preserved by venting to the auxiliary reservoir.

On a sudden reduction in train pipe pressure, the main piston 15 moves outwardly to the emergency position, seating on the usual emergency gasket as shown in Fig. 6. In this position the chamber at the outer face of the supplemental piston 18 is open through passage 25 to the exhaust cavity 30 and exhaust port 31, so that piston 18 moves to its outer position, in which the supplemental valve uncovers brake cylinder port 22. Cross over port 37 also establishes communication from passage 32 and the control pipe, to passage 26, leading to the supplemental valve chamber, consequently air flows from the control pipe line to the brake cylinder. Air is also supplied to the brake cylinder from the auxiliary reservoir through a passage 43, which establishes communication between the auxiliary reservoir and the supplemental valve chamber 17. The passage 43 contains a check valve 44 to prevent back flow from the supplemental valve chamber 17 to the auxiliary reservoir space.

A high brake cylinder pressure is thus obtained in an emergency application of the brakes by reason of the flow of air from the control pipe line or the supplemental reservoir, in addition to the air from the auxiliary reservoir. The high brake cylinder pressure thus produced causes the check valve 44 to close against the lower auxiliary reservoir pressure, thus preventing back flow of fluid at the higher pressure from the brake cylinder to the auxiliary reservoir, so that when it is desired to release the brakes after an emergency application no difficulty will be experienced, as the auxiliary reservoir pressure has not been raised above the usual normal degree of equalization.

The brakes may be released after an emergency application in the usual way, by increasing the train pipe pressure to slightly above that remaining in the auxiliary reservoir, whereupon the valve parts are shifted to release position in which the brake cylinder is connected to the atmosphere. It will also be noted that a portion of the air in the brake cylinder is returned to the auxiliary reservoir in the movement of the parts to release position in the same manner as described in connection with releasing the brakes after a secondary service application, as will be apparent.

It will thus be apparent that my invention possesses the flexibility of the usual standard air brake and has the advantage that a considerably higher pressure may be obtained in service applications of the brakes, when desired.

Having now described my invention, what I claim as new and desire to secure by Letters Patent is:—

1. In a fluid pressure brake, the combination with a train pipe, auxiliary reservoir, brake cylinder, and a supplemental source of fluid pressure supply, of a triple valve device operating upon a gradual reduction in train pipe pressure to admit air from the auxiliary reservoir to the brake cylinder, and upon a further reduction in train pipe pressure, for supplying air from said supplemental source of fluid pressure to the brake cylinder.

2. In a fluid pressure brake, the combination with a train pipe, auxiliary reservoir, brake cylinder and supplemental source of fluid pressure supply, of a triple valve device actuated by reductions in train pipe pressure to supply air from the auxiliary reservoir to the brake cylinder, and means, operating upon further reductions in train pipe pressure after substantial equalization of auxiliary reservoir pressure into the brake cylinder for supplying air from said supplemental source of fluid pressure to the brake cylinder.

3. In a fluid pressure brake, the combination with a train pipe, auxiliary reservoir, brake cylinder and an additional source of fluid under pressure, of a valve mechanism subject to the opposing pressures of the auxiliary reservoir and train pipe and adapted on primary gradual reductions in train pipe pressure to supply air from the auxiliary reservoir, and on further reductions from said additional source of fluid pressure, to the brake cylinder.

4. In a fluid pressure brake, the combination with a train pipe, auxiliary reservoir, brake cylinder, and additional source of fluid pressure supply, of a piston subject to the opposing pressures of the train pipe and auxiliary reservoir, and a valve operated thereby and having means for establishing communication between the auxiliary reservoir and brake cylinder in one position, on gradual reductions in train pipe pressure to the point of equalization, and adapted on further reductions in train pipe pressure to assume another position and establish communication between the additional source of fluid pressure supply and the brake cylinder and open a vent from the auxiliary reservoir.

5. In a fluid pressure brake, the combination with a train pipe, auxiliary reservoir, brake cylinder, and a supplemental source of fluid pressure, of a valve mechanism subject to the opposing pressures of the train pipe and auxiliary reservoir and operated upon gradual reductions in train pipe pressure for successively supplying air from the auxiliary reservoir and from said supplemental source of fluid pressure to the brake cylinder.

6. In a fluid pressure brake, the combination with a brake cylinder, train pipe, auxiliary reservoir, and supplemental source of fluid pressure of a valve mechanism subject to the opposing pressures of the train pipe and auxiliary reservoir for at one time supplying air from the auxiliary reservoir and at another time from said supplemental source of fluid pressure to the brake cylinder in service applications of the brakes.

7. In a fluid pressure brake, the combination with a train pipe, brake cylinder, and auxiliary reservoir, of a valve mechanism subject to the opposing pressures of the train pipe and auxiliary reservoir for governing the supply of air to, and its release from, the brake cylinder and adapted to be actuated after an application of the brakes, by a gradual increase in train pipe pressure, to open communication from the brake cylinder to the exhaust, and to the auxiliary reservoir.

8. In a fluid pressure brake, the combination with a train pipe, auxiliary reservoir, brake cylinder and supplemental source of fluid pressure supply, of a valve and piston operated by primary gradual reductions in train pipe pressure, for opening communication from the auxiliary reservoir to an outlet passage and by further gradual reductions in train pipe pressure for opening communication from said supplemental source of fluid pressure to another outlet passage, and means for controlling communication between said outlet passages and the brake cylinder.

9. In a fluid pressure brake, the combination with a train pipe, auxiliary reservoir, brake cylinder and supplemental source of fluid pressure supply, of a valve and piston operated by primary gradual reductions in train pipe pressure, for opening communication from the auxiliary reservoir to an outlet passage and by further gradual reductions in train pipe pressure for opening communication from said supplemental source of fluid pressure to another outlet passage, and a valve, normally establishing communication between said auxiliary reservoir outlet passage and the brake cylinder and adapted on said further reductions in train pipe pressure to close said communication and connect said other outlet to the brake cylinder.

10. In a fluid pressure brake, the combination with a train pipe, auxiliary reservoir, brake cylinder and supplemental source of fluid pressure supply, of a valve and piston operated by primary gradual reductions in train pipe pressure, for opening communication from the auxiliary reservoir to an outlet passage and by further gradual reductions in train pipe pressure for opening communication from said supplemental source of fluid pressure to another outlet passage, a piston subject to fluid pressure, a valve actuated thereby, for normally connecting said auxiliary reservoir outlet passage to the brake cylinder, and means governed by said main valve for venting fluid from one side of said piston, in the position for opening communication from said supplemental source to its outlet passage, and thereby shifting said valve to close the first outlet and open the second.

11. In a fluid pressure brake the combination with a train pipe, auxiliary reservoir, brake cylinder, and supplemental source of fluid pressure, of valve means operated by primary reductions in train pipe pressure for controlling communication from the auxiliary reservoir to the brake cylinder, and by further or secondary reductions in train pipe pressure in service applications for controlling communication from the supplemental source to the brake cylinder.

12. In a fluid pressure brake the combination with a train pipe, auxiliary reservoir, brake cylinder, and supplemental source of fluid pressure, of valve means operated by the opposing pressures of the train pipe and the auxiliary reservoir for controlling communication from the auxiliary reservoir to a vent port and from the supplemental source to the brake cylinder.

13. In a fluid pressure brake the combination with a train pipe, auxiliary reservoir, brake cylinder, vent chamber, and supplemental source of fluid pressure, of a valve means operated by the opposing pressures of the train pipe and auxiliary reservoir for controlling communication from the auxiliary reservoir to the vent chamber and from the supplemental source to the brake cylinder.

14. In a fluid pressure brake the combination with a train pipe, auxiliary reservoir, brake cylinder, vent chamber, and supplemental source of fluid pressure, of a valve device subject to the opposing pressures of the train pipe and auxiliary reservoir and operated by a primary reduction in train pipe pressure to open communication from the auxiliary reservoir to the brake cylinder, and by a further or secondary reduction in train pipe pressure in service applications to open communication from the auxiliary reservoir to the vent chamber and from the supplemental source to the brake cylinder.

15. In a fluid pressure brake the combination with a train pipe, auxiliary reservoir, brake cylinder, and supplemental source of fluid pressure, of means for increasing the brake cylinder pressure above that of the auxiliary reservoir in applying the brakes, and means for returning a portion of the fluid from the brake cylinder to the auxiliary reservoir upon the release of the brakes.

16. In a fluid pressure brake the combination with a train pipe, auxiliary reservoir, brake cylinder, and supplemental source of fluid pressure, of means for increasing the brake cylinder pressure above that of the auxiliary reservoir in applying the brakes and mechanism operative upon an increase in train pipe pressure for first opening communication from the brake cylinder to the auxiliary reservoir, and then from the brake cylinder to the exhaust.

17. In a fluid pressure brake the combination with a train pipe, auxiliary reservoir, brake cylinder, and supplemental source of fluid pressure, of a valve device operated by reductions in train pipe pressure for supplying air from the auxiliary reservoir to the brake cylinder and from the supplemental source to the brake cylinder, and means operating upon an increase in train pipe pressure for opening communication from the brake cylinder to the auxiliary reservoir.

18. In a fluid pressure brake, the combination with a train pipe, auxiliary reservoir, brake cylinder, and supplemental source of fluid pressure, of a valve device operated by primary reductions in train pipe pressure for opening communication from the auxiliary reservoir to the brake cylinder, by further or secondary reductions in train pipe pressure for opening communication from the supplemental source to the brake cylinder and from the auxiliary reservoir to a vent port, and by an increase in train pipe pressure for first opening communication from the brake cylinder to the auxiliary reservoir and then to the exhaust.

19. In a fluid pressure brake, the combination with a train pipe, auxiliary reservoir, brake cylinder, and a supplemental source of fluid pressure, of a valve mechanism operated by variations in train pipe pressure for controlling the supply of air from the auxiliary reservoir to the brake cylinder and from the supplemental source to the brake cylinder, and from the brake cylinder to the exhaust, and a valve device for cutting off communication from the brake cylinder to the exhaust of the first valve mechanism until the pressures of the auxiliary reservoir and brake cylinder substantially equalize.

20. In a fluid pressure brake the combination with a train pipe, auxiliary reservoir, brake cylinder, and a supplemental source of fluid pressure, of a valve mechanism operated by variations in train pipe pressure for controlling the supply of air from the auxiliary reservoir to the brake cylinder and from the supplemental source to the brake cylinder, and from the brake cylinder to the exhaust, and a valve device governed by the movement of the first mentioned valve mechanism for controlling communication from the brake cylinder to the exhaust of said valve mechanism.

21. In a fluid pressure brake, the combination with a train pipe, auxiliary reservoir, and brake cylinder, of a valve device subject to the opposing pressures of the train pipe and auxiliary reservoir and operating upon a reduction in train pipe pressure for supplying air separately from different sources of fluid under pressure to the brake cylinder.

22. In a fluid pressure brake, the combination with a train pipe, auxiliary reservoir, and brake cylinder, of a triple valve device adapted upon a gradual reduction in train pipe pressure below the equalizing point to supply air to the brake cylinder at a pressure higher than the equalizing pressure of the auxiliary reservoir and brake cylinder.

23. In a fluid pressure brake, the combination with a train pipe, auxiliary reservoir, brake cylinder, and an additional source of fluid pressure, of a piston subject to the opposing pressures of the auxiliary reservoir and train pipe and valve means operated thereby upon a gradual reduction in train pipe pressure to make a partial traverse at one time for opening communication from the auxiliary reservoir to the brake cylinder and a further traverse at another time for opening communication from said additional source of fluid pressure to the brake cylinder and for venting air from the auxiliary reservoir.

24. In a fluid pressure brake, the combination with a train pipe, auxiliary reservoir, and brake cylinder, of an automatic valve device operating in response to reductions in train pipe pressure for opening a communication from the auxiliary reservoir to the brake cylinder in one position and from another source of fluid pressure in another position and a fluid pressure operated valve mechanism for controlling communication from said valve device to the brake cylinder.

25. In a fluid pressure brake, the combination with a train pipe, auxiliary reservoir, brake cylinder, and a supplemental source of fluid pressure, of a triple valve device having a passage through which air is supplied from the auxiliary reservoir to the brake cylinder upon a gradual reduction in train pipe pressure and a valve device controlling communication through said passage and adapted upon a sudden reduction in train pipe pressure to supply air from said supplemental source of fluid pressure to the brake cylinder.

In testimony whereof I have hereunto set my hand.

WALTER V. TURNER.

Witnesses:
R. F. EMERY,
WM. M. CADY.